(12) United States Patent
Grossard et al.

(10) Patent No.: US 10,661,451 B2
(45) Date of Patent: May 26, 2020

(54) CLAMP GRIPPING DEVICE AND SYSTEM CONSISTING OF SUCH DEVICES

(71) Applicant: COMMISSARIAT A L'ENERGIE ATOMIQUE ET AUX ENERGIES ALTERNATIVES, Paris (FR)

(72) Inventors: Mathieu Grossard, Verrieres le Buisson (FR); Maxime Beck, Paris (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/483,432

(22) PCT Filed: Feb. 19, 2018

(86) PCT No.: PCT/EP2018/054014
§ 371 (c)(1),
(2) Date: Aug. 4, 2019

(87) PCT Pub. No.: WO2018/162212
PCT Pub. Date: Sep. 13, 2018

(65) Prior Publication Data
US 2020/0009745 A1    Jan. 9, 2020

(30) Foreign Application Priority Data
Mar. 7, 2017 (FR) ...................... 17 51834

(51) Int. Cl.
*B25J 15/12* (2006.01)
*B25J 9/00* (2006.01)
*B25J 11/00* (2006.01)

(52) U.S. Cl.
CPC ............ *B25J 15/12* (2013.01); *B25J 9/0015* (2013.01); *B25J 11/0045* (2013.01)

(58) Field of Classification Search
CPC ....... B25J 15/12; B25J 11/0045; B25J 9/0015
(Continued)

(56) References Cited

U.S. PATENT DOCUMENTS 3,616,497 A * 11/1971 Esposito, Jr. ......... H01L 23/291
                                                        24/542
4,141,138 A * 2/1979 Quick ............... H05K 13/0447
                                                        29/740
(Continued)

FOREIGN PATENT DOCUMENTS

| CN | 102 328 311 A | 1/2012 |
| CN | 202 622 796 U | 12/2012 |

(Continued)

OTHER PUBLICATIONS

Chen, et al., "Active Release of Microobjects Using a MEMS Microgripper to Overcome Adhesion Forces ", Journal fo Microelectromechanical Systems, vol. 18, Issue: 3, pp. 652-659, Jun. 2009.
(Continued)

*Primary Examiner* — Paul T Chin
(74) *Attorney, Agent, or Firm* — Baker & Hostetler LLP (57) ABSTRACT

The device includes at least: a bar longitudinally mobile along an axis of symmetry provided at one end with a plate; a first rigid connection and a second rigid connection which are symmetrical about the axis, each ending in a jaw, the two jaws forming a gripper clamp able to pick up an object; two pairs of flexible beams which are symmetrical about the axis, the beams each being connected by one end to one of the rigid connections, the other end being fixed, and guiding the movements of the rigid connections perpendicular to the axis, the ends of a pair of beams forming a parallelogram; two pairs of flexible beams which are symmetrical about the axis, the beams each being connected by one end to one of the rigid connections, the other end being connected to the
(Continued)

bar, and guiding the movements of the bar parallel to the axis, the ends of a pair of beams forming a parallelogram.

15 Claims, 10 Drawing Sheets

(58) Field of Classification Search
USPC .................................................. 294/99.1, 87.1
See application file for complete search history.

(56) References Cited

U.S. PATENT DOCUMENTS

| | | | | |
|---|---|---|---|---|
| 4,175,728 A * | 11/1979 | Ferguson | ................... | F16L 3/04 |
| | | | | 24/16 R |
| 5,267,764 A * | 12/1993 | Hoffman | ................... | E04B 9/18 |
| | | | | 248/340 |
| 6,290,276 B1 | 9/2001 | Sherwin | | |
| 7,065,912 B2 * | 6/2006 | Pitcher | ..................... | G09F 3/20 |
| | | | | 248/231.61 |
| 7,384,086 B2 * | 6/2008 | Lukaszynski | ...... | H01H 85/0208 |
| | | | | 29/278 |
| 8,007,019 B1 * | 8/2011 | Pei | ........................... | C23C 14/50 |
| | | | | 294/118 |
| 8,011,708 B2 * | 9/2011 | Becker | ..................... | B25J 9/142 |
| | | | | 294/196 |
| D674,685 S * | 1/2013 | Dixon | ........................... | D8/395 |
| 9,604,348 B2 * | 3/2017 | Wu | ........................... | B25B 9/02 |
| 9,720,007 B2 * | 8/2017 | Nuotio | ............... | G01N 35/0099 |
| 2006/0043749 A1 * | 3/2006 | Huang | ...................... | B25J 7/00 |
| | | | | 294/99.1 |
| 2020/0003285 A1 * | 1/2020 | Beck | ....................... | F16H 25/20 |

FOREIGN PATENT DOCUMENTS

| | | |
|---|---|---|
| CN | 103 331 748 A | 10/2013 |
| DE | 101 07 402 A1 | 8/2002 |

OTHER PUBLICATIONS

Liu, et al., "Design and analysis of a large-range micro-gripper", Conference: 2015 International Conference on Manipulation, Manufacturing and Measurement on the Nanoscale (3M-NANO), Oct. 2015.

* cited by examiner

CLAMP GRIPPING DEVICE AND SYSTEM CONSISTING OF SUCH DEVICES

CROSS-REFERENCE TO RELATED APPLICATIONS

This application is a National Stage of International patent application PCT/EP2018/054014, filed on Feb. 19, 2018, which claims priority to foreign French patent application No. FR 1751834, filed on Mar. 7, 2017, the disclosures of which are incorporated by reference in their entirety.

FIELD OF THE INVENTION

The present invention relates to a gripper device, of the gripper clamp type. It also relates to a gripper system made up of such devices.

The invention is notably applicable to the picking and placing of fragile and sticky objects, for example deformable food products on an agri foodstuffs production line.

BACKGROUND

Automated agri foodstuffs production lines, from start right through to packaging, generally require a large number of handling operations involving picking up food products while at the same time meeting strict hygiene standards.

Various types of gripper are known. A first type is to grip using pneumatic suction. These are all-or-nothing systems that apply unknown gripping forces and are unable to cope with errors in the positioning of the products. The efficiency of the gripping of the object is low because of the high variability in the geometry of the objects handled. The placement efficiency is also low because there is no system to deal with the random sticking to the gripper tool and which ensures a correct final position in the placement zone.

Another type is gripping using a two-fingered gripper with two symmetrical jaws. There is no placement system to overcome the problem of sticking and there may be products that fail to be picked or products that become crushed under forces that in theory have no set boundaries.

Gripping using underactuated flexible elements are another type of gripper. Again, one disadvantage is the fact that it is impossible to overcome the problem of sticking.

SUMMARY OF THE INVENTION

It is an object of the invention to overcome the aforementioned disadvantages by notably allowing an automated gripping of fragile, deformable and sticky food products while at the same time meeting the strictest of hygiene safety standards. To this end, one subject of the invention is a gripper device of the gripping clamp type, comprising at least:
  a bar longitudinally mobile along an axis of symmetry;
  a first rigid connection and a second rigid connection which are symmetrical about said axis, each ending in a jaw, the two jaws forming a gripper clamp able to pick up an object;
  two first pairs of flexible beams which are symmetrical about said axis, said beams each being connected by one end to one of said rigid connections, the other end being fixed, and guiding the movements of said rigid connections perpendicular to said axis, the ends of each of the first pairs of beams forming a parallelogram;
  two second pairs of flexible beams which are symmetrical about said axis, said beams each being connected by one end to one of said rigid connections, the other end being connected to said bar, and guiding the movements of said bar parallel to said axis, the ends of each of the second pairs of beams forming a parallelogram;
  the movements of said jaws being brought about by actuation of said bar, a force exerted on said bar in a direction away from said jaws causing said jaws to move closer together, a force U' exerted in the direction of said jaws causing said jaws to open.

In one particular embodiment, said bar is provided at one end with a plate, the length of said bar being such that said plate is able to push said object when said force U' is exerted toward the jaws, the pushing being performed simultaneously with the opening of the jaws.

Said device is, for example, monolithic.

Said beams having a fixed end are, for example, connected to a rigid part able to be fixed to a structure.

Said beams are, for example, curved and not parallel.

Said beams connected to said bar comprise, for example, several rectilinear sections, the sections leading from the ends of said beams being parallel, said beams comprising, for example, three rectilinear sections.

Said beams have, for example, non-constant cross sections, the cross sections being at a maximum at the points of attachment of said beams and decreasing toward the center of said beams.

Said jaws are, for example, flexible. They have, for example, a width that allows them to pick at least two objects at a time.

Activation of said bar is, for example, performed by means of a ring fixed to the opposite end of said bar to said plate.

Another subject of the invention is a gripper system comprising a set of devices like the one described hereinabove.

Said devices are, for example, positioned in at least a double row, in a staggered configuration.

Said beams having a fixed end are, for example, fixed to a structure in the form of a plate.

Said system is, for example, able to be used in an agri foodstuffs production line, said object then being a deformable food product.

BRIEF DESCRIPTION OF THE DRAWINGS

Further features and advantages of the invention will become apparent from the following description given with reference to the attached drawings which depict.

DETAILED DESCRIPTION

Figure 1:
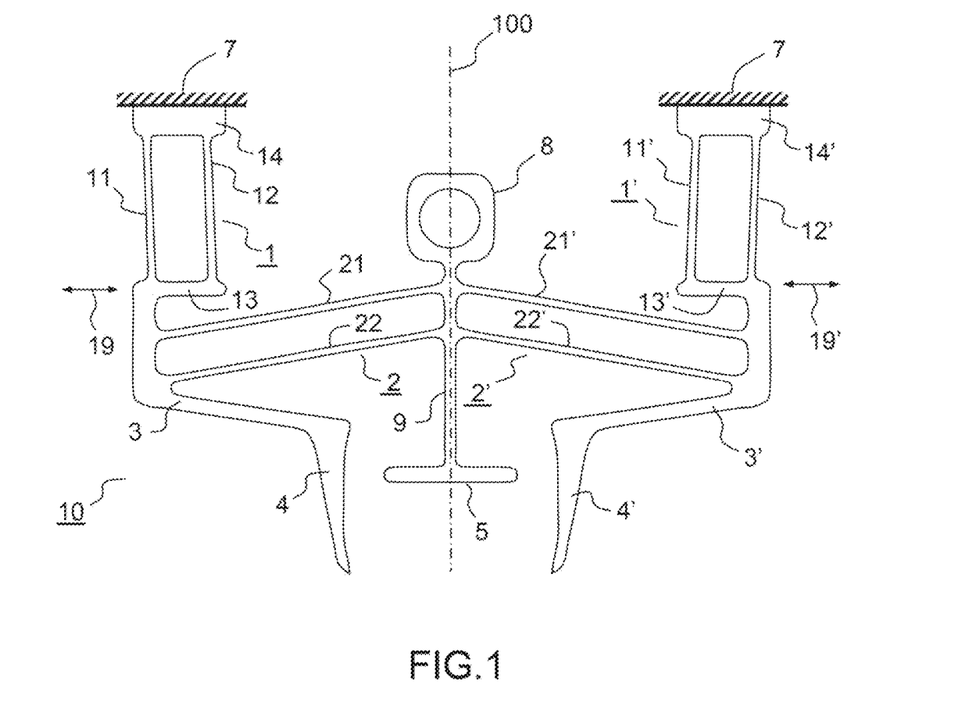
FIG. 1: a first exemplary embodiment of a gripper device according to the invention.

FIG. 1 shows a first possible embodiment of a gripper device 10 according to the invention. For the remainder of the description it will be considered by way of example that the device is used to perform "pick and place" operations. There are a number of possible applications.

The device is formed in a deformable monolithic body that is symmetrical about an axis 100, comprising an ejector plate 5 and two jaws 4, 4' forming a gripper clamp. The movements of the plate 5 and of the jaws 11, 12 are commanded by four structures in the form of deformable parallelograms 1, 1', 2, 2', also known as a 4-bar system. Hereinafter, for the sake of simplification, these structures will be referred to as parallelograms.

More specifically, a first pair of parallelograms 1, 1', which are symmetrical about the axis 100, controls the movements of the jaws 4, 4'. The second pair of parallelograms, which are symmetrical about the axis 100, controls the movements of the plate 5. Furthermore, the two pairs of parallelograms interact with one another.

The parallelograms 1, 1' of the first pair are fixed to a structure 7. This structure is, for example, part of a robot or any other automated device.

Each fixed parallelogram is connected to a jaw by means of a rigid connection 3, 3', this being connected to the side 13, 13' of the parallelogram which is the opposite side to said structure 7. As a result, any movement brought about on this side 11, 11' is transmitted to the jaws 4, 4'. The jaws may themselves be rigid or flexible, as required.

The parallelograms 2, 2' of the second pair are connected on the one hand to the rigid connections 3, 3' and on the other hand to a bar 9 bearing the plate 5 arranged in a plane perpendicular to the axis of the bar and coincident with the axis of symmetry 100.

At the opposite end from the plate 5, the bar comprises an actuating point embodied in the example of FIG. 1 by a ring 8. This actuating point constitutes the input point of the gripper device, the three outputs being the plate 5 and the two jaws 4, 4'. These are an input point and output points insofar as the forces applied for causing the plate and the jaws to move are applied to this input point.

The parallelogram structures will now be described in greater detail. In the remainder of the description, the parallelograms of the first pair 1, 1' and of the second pair 2, 2' will be referred to respectively as the upper parallelograms and as the lower parallelograms, given their respective positions.

Figure 2:
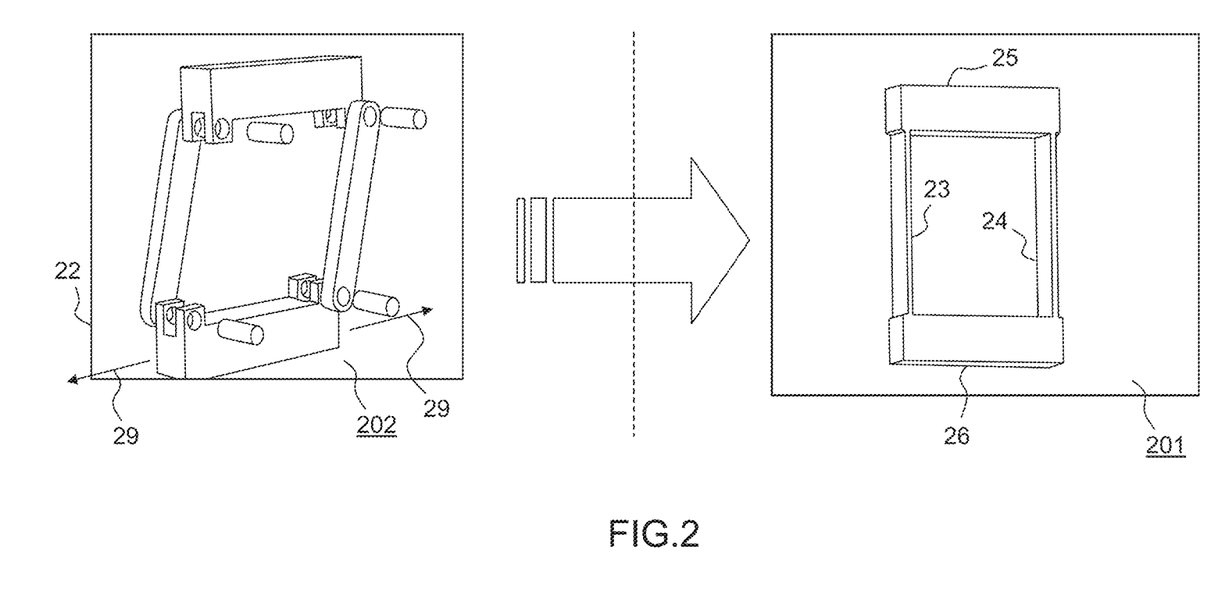
FIG. 2: a parallelogram-type structure.

FIG. 2 shows a monolithic parallelogram structure 201 of the type of those 1, 1', 2, 2' used in the gripper device according to the invention. This parallelogram structure is made up of two opposite rigid sides connected by two parallel flexible beams 23, 24. These beams act as a flexible guidance system by flexing at their attachment points, while at the same time being stiff in terms of tension. This flexible-beam parallelogram structure is able to replace the guidance 29 obtained with a polyarticulated parallelogram structure 202, with rotation pivots.

The beams 23, 24 which are flexible in terms of bending and stiff in terms of tension make it possible to obtain guidance in pure rectilinear movements, which means to say precise movements, parallel to the other two sides 25, 26 of the parallelogram, to which sides the beams are attached.

Returning to FIG. 1, each upper parallelogram comprises two parallel beams 11, 12, 11', 12' connected on the one hand to the fixed side 14, 14' and on the other hand to the opposite free side 13, 13', connected to the rigid connection 3, 3'. By construction, this side 13, 13' forms an integral part of the rigid connection. A rigid connection is thus made up of three parts: a horizontal part connected to the first pair of beams 11, 12, 11', 12', a vertical part connected to the second pair of beams 21, 22, 21', 22', and a part which bends over toward the axis of symmetry 100, this last part bearing the jaw 4, 4'. The length of this part is dependent on the desired initial separation between the jaws.

A deformation brought about to the first upper parallelogram 1 leads to a pure rectilinear movement 19, 19' of its free side 13, 13'. This pure rectilinear movement is transmitted by translation to the jaw 4, via the rigid connection 3 according to the parallelogram guidance described above. The same phenomenon occurs between the second parallelogram 1' and the jaw connected to it.

Each lower parallelogram comprises two beams 21, 22, 21', 22' connected on the one hand to the rigid connection 3, 3' connecting the upper parallelogram to the jaw, and on the other hand to the bar 9 connected to the plate 5. Structurally, the side of the lower parallelogram forms an integral part of the rigid connection 3, 3'. Likewise, the bar 9 incorporates the other side of the parallelogram. In other words, the beams 21, 22, 21', 22' are directly connected to the rigid connection and to the bar.

Deformation of the lower parallelograms 2, 2' causes a pure rectilinear movement of the bar 9 and therefore of the plate 5 along the axis of symmetry 100.

Figure 3:
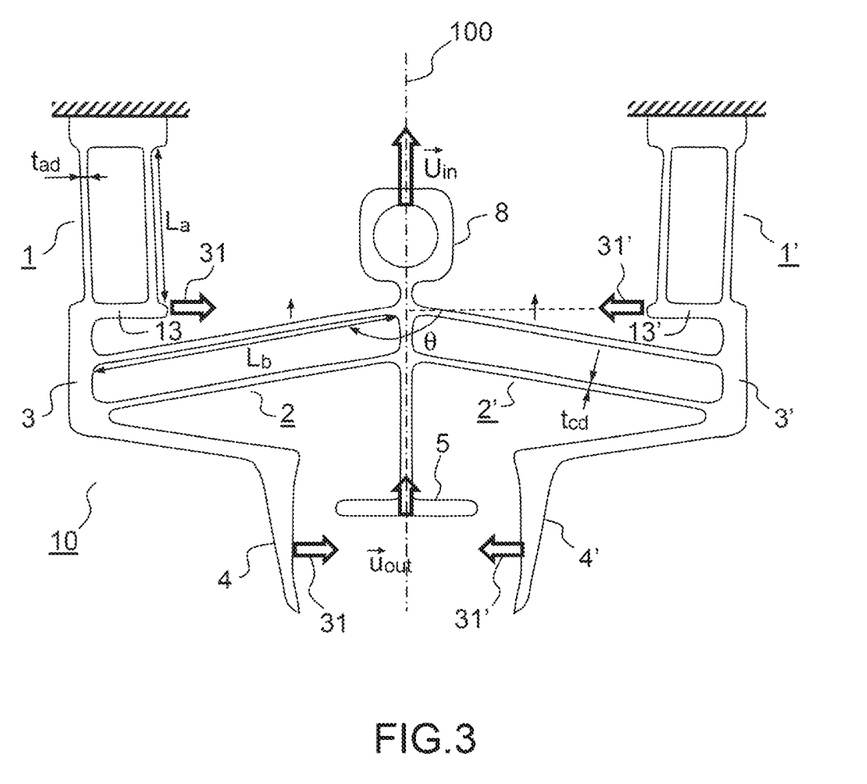
FIG. 3: an illustration of the way in which a device according to the invention is activated.

FIG. 3 illustrates how the device according to the invention is activated. The device is controlled by a force U exerted on the activation point 8 in a rectilinear path along the axis of symmetry 100 in one direction or the other, in practice upward or downward. FIG. 3 illustrates the scenario in which the force is exerted upward. The activation of the input point causes the three output points 4, 4', 5 to start to move. The upward movement of the input point causes upward deformation of the lower parallelograms 2, 2', leading to deformation of the upper parallelograms 1, 1'. This guides the pure rectilinear movement of the free sides 13, 13', and therefore of the rigid connections 3, 3', toward the axis of symmetry 100, thus causing the jaws 4, 4' to move closer together and therefore bringing about a clamping action. Synchronized with this, the plate 5 experiences an upward pure rectilinear movement guided by the two upper parallelograms 2, 2'.

An activation force exerted downward brings about the opposite rectilinear movements, namely guides the plate 5 downward and guides the jaws away from each other, thus unclamping.

Finally, a device according to the invention has three positions: a "rest" position, without actuation, which takes effect during the phase of approach around the object that is to be picked, in which the initial separation between the jaws 4, 4' and the travel of the jaws can be adapted to a whole parametric and geometric range of objects;

a "pulled" position in which there is actuation allowing the input point 8 of the mechanism to withdraw. In this case, the plate 5 "retracts" and the jaws clamp around the product. The extreme "pulled" position allows the application of enough force to pick the smallest object (up to 0.2 mm of crushing in the case of a flexible object), while not crushing the largest flexible object (less than 2 mm);

a third position, corresponding to the "guided release" of the object, and therefore to the opening of the jaws and the pushing of the plate 5 to allow the product to be righted if it has become stuck to the jaws and placed correctly in a housing intended for that purpose.

Figure 4:
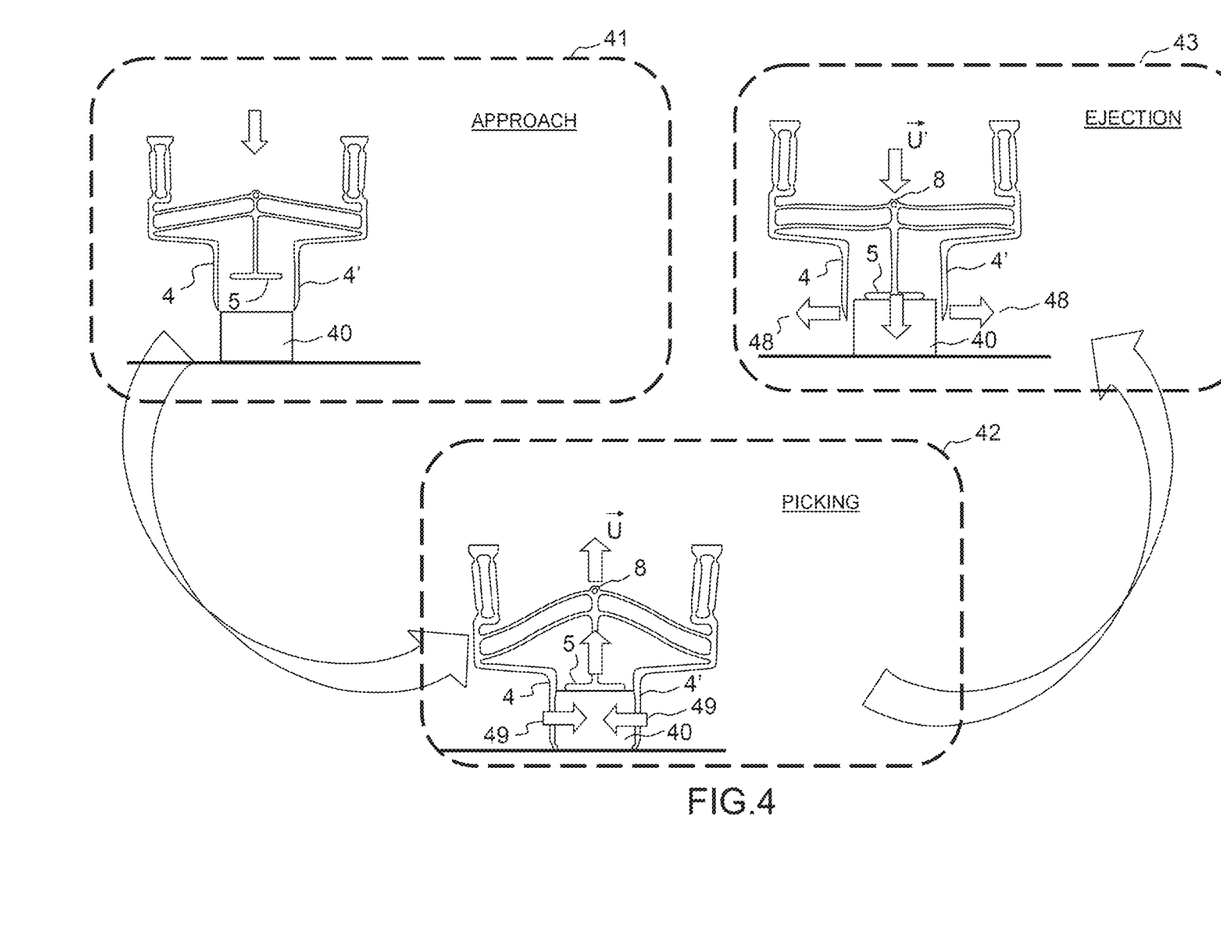
FIG. 4: a cycle of picking and placing an object using a device according to the invention.

FIG. 4 illustrates the aforementioned positions in the form of a cycle for the picking and placing of a flexible object 40. The gripper device is the one illustrated in FIGS. 1 and 3.

This cycle comprises an approach phase 41, a phase 42 of picking the object and a phase 43 of ejecting the object.

In the approach phase 41, the plate 5 is not in contact with the object and the jaws are in the open position. The structure 7 to which the gripper device is fixed is, for example, a robot arm the movement of which is guided toward the object, causing the device to be guided toward the object. At the end of the approach phase, the jaws come level with the object and the plate 5 is just kissing the object.

In the picking phase 42, an activation force U is exerted on the activation point 8, in the direction away from the jaws 4, 4', causing the object to be clamped 49 by the jaws, acting as a gripper clamp, and causing the plate to be guided upward.

In the ejection phase, an opposite activation force U' is exerted on the activation point 8, in the direction of the jaws, causing the jaws to open and therefore causing the unclamping 49 of the object, and guiding the plate 5 downward until it is between the jaws, the plate then acting as a pusher to push the object.

In practice, the movement of the activation point in one direction or the other may be by less than one centimeter, for example of the order of 7 mm.

The gripper device according to the invention is under-actuated, which means to say that it has more degrees of freedom than it does actuators. In effect, a single actuating point makes it possible to obtain, in a phase 42, the controlled tightening of the jaws around the object 40 and then, in a subsequent phase 43, guaranteed placement by translational movement of the push plate 5 toward the object. The pure translational movement of the plate 5 perpendicular to the opening path of the jaws 4, 4' makes it possible to avoid the object sticking to the jaws and to correct for final positioning errors when placing. In the case of the placement of a bite of cheese, for example, the push applied by the plate makes it possible to prevent the product from sticking to the jaws and allows accurate positioning in a container for example.

The intrinsic structure of the device according to the invention thus allows a combination of the movements of opening of the gripper jaws 4, 4' and pushing of the plate 5, acting as a stripper plate. This is therefore a gripper device with an in-built stripper system that requires neither external energy nor a delayed stripping cycle.

Figure 5:
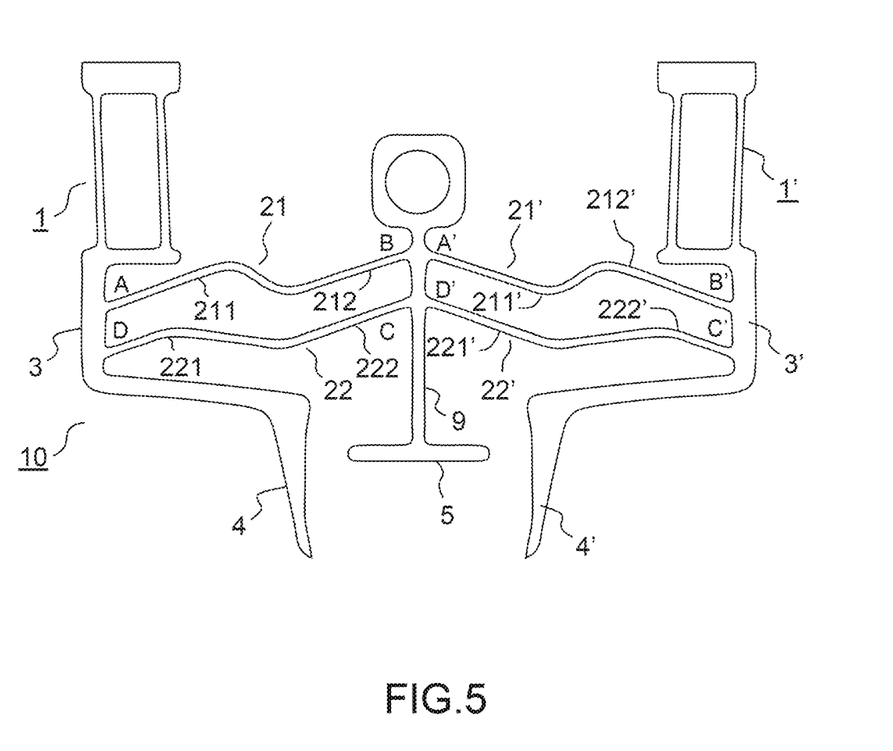
FIG. 5: another exemplary embodiment of a gripper device according to the invention.

FIG. 5 shows another possible embodiment of a gripper device according to the invention. In this exemplary embodiment, the beams 21, 22, 21', 22' of the lower parallelograms are no longer rectilinear. From the strictly geometric standpoint, these beams therefore no longer form a parallelogram. However, we continue to employ the term "parallelogram" because the points A, B, C, D (A', B', C', D') of attachment of the beams to the rigid parts, namely to the rigid connections 3, 3' and the bar 9 still do form a parallelogram. Advantageously, this embodiment makes it possible overall to reduce the maximum stresses. As will be seen later on, the curved nature makes it possible to reduce the actuating force because this curved nature effectively increases the beam length and therefore its flexibility in bending and therefore overall reduces all stresses. The nonparallel nature means that the distribution of stresses between two beams facing each other can be made symmetrical.

Figure 6:
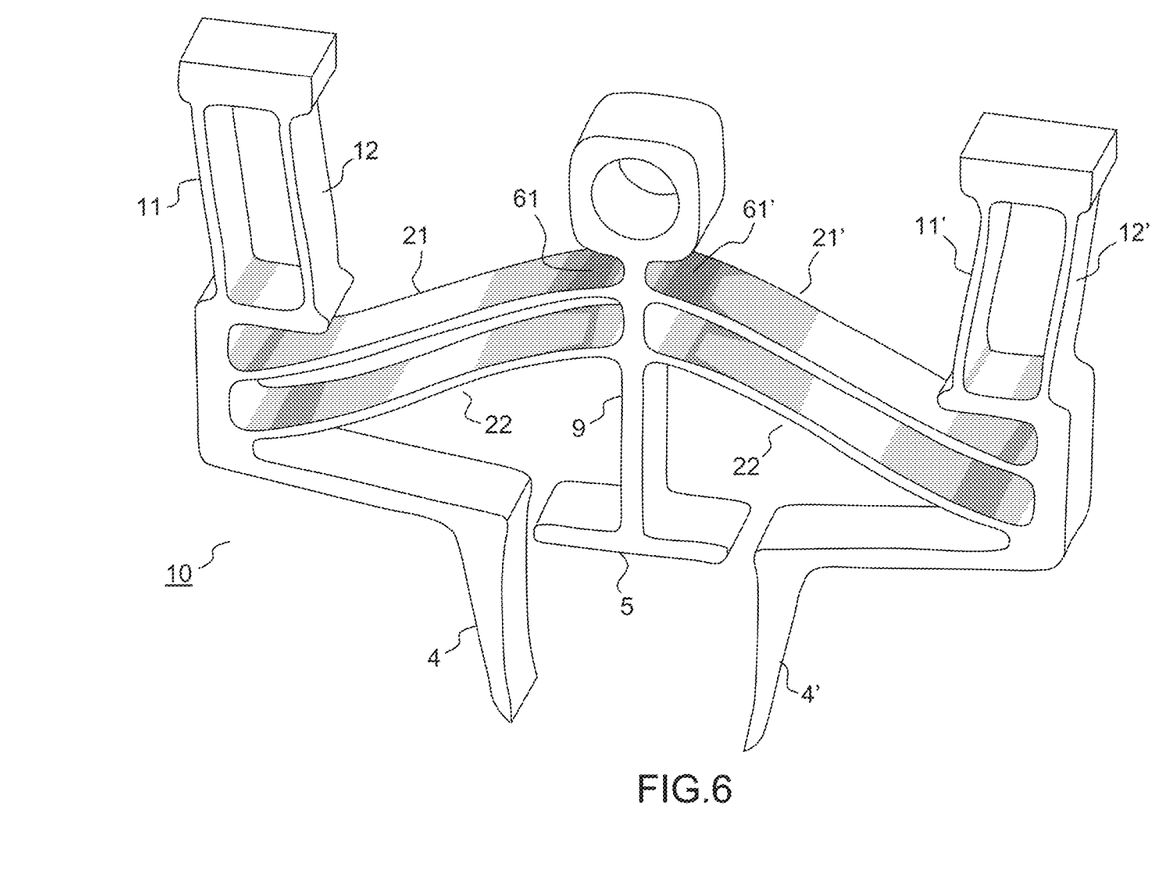
FIG. 6: a depiction of the mechanical stresses liable to be experienced in one embodiment of a device according to the invention.

FIG. 6 shows a perspective view of the gripper device shown in FIG. 1. Using shades of gray it illustrates the stresses exerted on the beams of the lower parallelograms. In particular, a concentrated area of stress 61, 61' can be seen on the upper beams 21, 21', near the bar 9. After a certain number of operating cycles, these stresses cause the beams to break. Given the high number of pick and place cycles required in food production lines in particular, it is absolutely essential that the gripper devices have a long life, and, more specifically, be able to withstand a very high number of operating cycles. The embodiment of FIG. 5 increases this life by more uniformly distributing the mechanical stresses exerted on the beams.

Returning to FIG. 5, the principle behind the embodiment of FIG. 5 is that of using pseudo parallelograms A, B, C, D (A', B', C', D') in which the beams 21, 22, 21', 22' are curved and not parallel. By thus increasing the length, and therefore the flexibility, of the beams, the stiffness of the whole is reduced and therefore so too is the actuating force needed to move the moving parts. Reducing the actuating force needed in fact reduces the stresses.

In the exemplary embodiment of FIG. 5, each beam 21, 22, 21', 22' comprises three rectilinear segments. The segments 211, 221, 212, 222, 211', 221', 212', 222' of the upper and lower beams that are connected to the rigid parts 3, 3', 9 are parallel over a section beginning at these rigid parts, namely at the vertices A, B, C, D (A', B', C', D') of the pseudo parallelograms. The shapes of the beams are symmetrical 21, 22, 21', 22' about the axis 100 so as to make it possible to eliminate parasitic movements introduced by these non-parallel beams.

These pseudo parallelogram structures advantageously make it possible to alleviate the presence of high stress levels within their constituent beams, and their use in an antagonistic setup (flexible guidance of the left jaw 4 in opposition to the flexible guidance of the right jaw 4') makes it possible to eliminate the aforementioned parasitic movements.

The use of beams that are not parallel, as illustrated notably in FIG. 5, makes it possible to optimize the way in which the system behaves, particularly the relationship between the movements of the jaws 4, 4' with respect to the plate 5, and to reduce the actuating force needed for picking objects. Thus, the maximum stress is reduced and the life of the device increased.

In other words, the way in which the deformation system, that a device according to the invention constitutes, behaves is directly dependent on the stiffness of the flexible guides of which the system is composed, through the curvature of its beams and their stiffness in bending and in tension. Increasing the flexural flexibility of the beams, corresponding to the large travel of the plate 5, makes it possible to reduce the actuating force and therefore the stresses involved.

It is also possible, if need be, to anticipate the use of curved non-parallel beams in the pairs of upper parallelograms 1, 1'.

Figure 7:
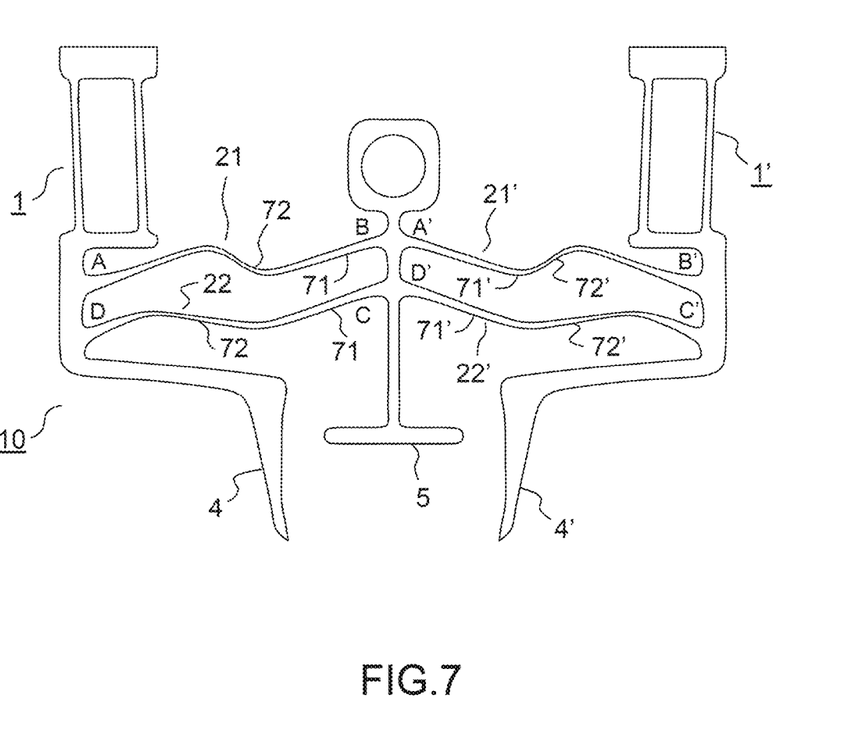
FIG. 7: another exemplary embodiment of a device according to the invention.

FIG. 7 shows another exemplary embodiment of a device according to the invention, which improves the even distribution of the mechanical stresses on the bars. As shown in FIG. 6, the stresses between the two beams that make up the one same flexible guide are not identical.

One objective of the optimization in the embodiment of FIG. 7 is to obtain uniform stress in each beam. Local changes to thicknesses are made in order to even out these stresses.

In this exemplary embodiment, variable cross sections are introduced into the flexible guide beams, at least on the lower beams 21, 22, 21', 22'. By locally increasing their thickness, the stress is locally reduced. The thickness is increased at the points 71, 71' where the stress is at a maximum, and in particular, the cross section is at a maximum at the points of attachment of the beams to the rigid parts 9, 3, 3' and then decreases toward the center of the beams.

Conversely, by removing material at the points 72, 72' of minimum stress, the internal stresses can be locally increased.

The variable cross section has the notable effect of reducing stress concentrations within the one same beam. By eliminating the points at which these stresses are concentrated, the life of the gripper device is further increased.

The uniformity cannot be perfect because it would be necessary to tend toward a zero beam thickness at the points of zero stress. However, the non-constant distribution of the volume or density of material along the longitudinal axis of the beams 21, 22, 21', 22', as illustrated in FIG. 7, allows the best possible distribution and uniformity of stresses along the entire length of the beams, thus further increasing their life.

It is also possible, if need be, to anticipate the use of curved beams with non-constant cross sections in the pairs of upper parallelograms 1, 1'.

Figure 8:
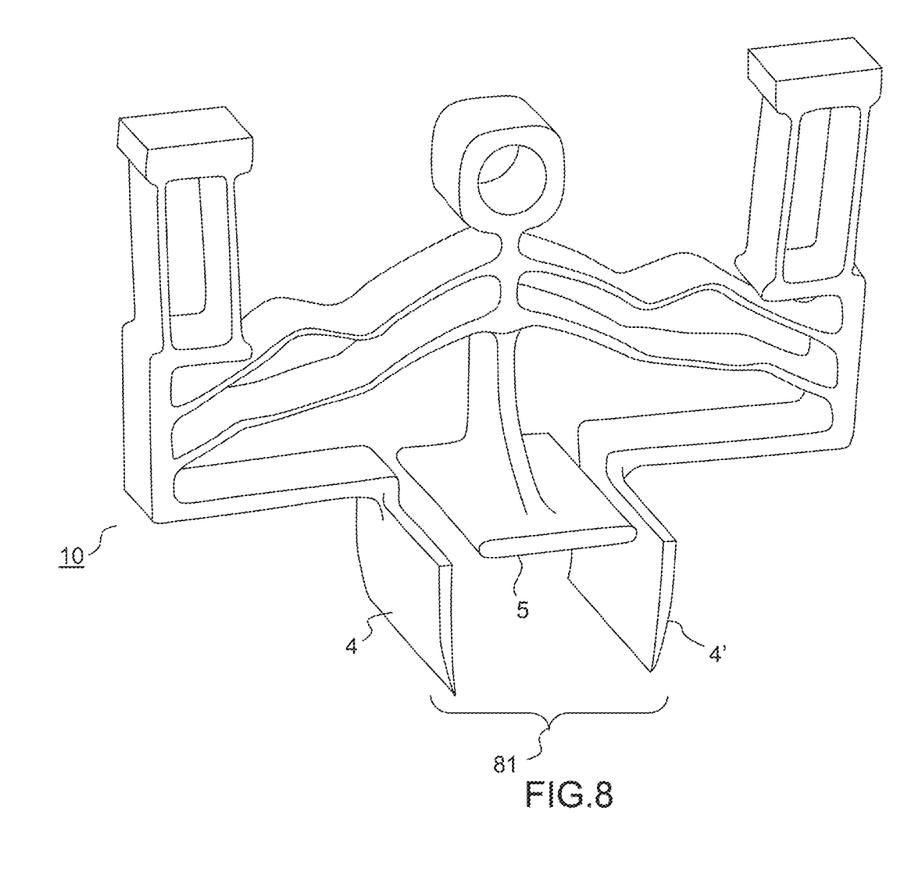
FIG. 8: one possible embodiment of the jaws of a device according to the invention.

FIG. 8 shows another exemplary embodiment of a device according to the invention. In this case, the gripper clamp 81 formed of the two jaws 4, 4' is designed to handle several objects 40, for example to grip two objects. To that end, the jaws 4, 4' are enlarged. The same is true of the push plate 5. This type of embodiment is notably advantageous in gripper systems comprising several gripper devices according to the invention in parallel and intended to grip a large quantity of objects in parallel.

A gripper clamp 81 of the type of FIG. 8 may also allow wider objects to be picked stably.

Figure 9:
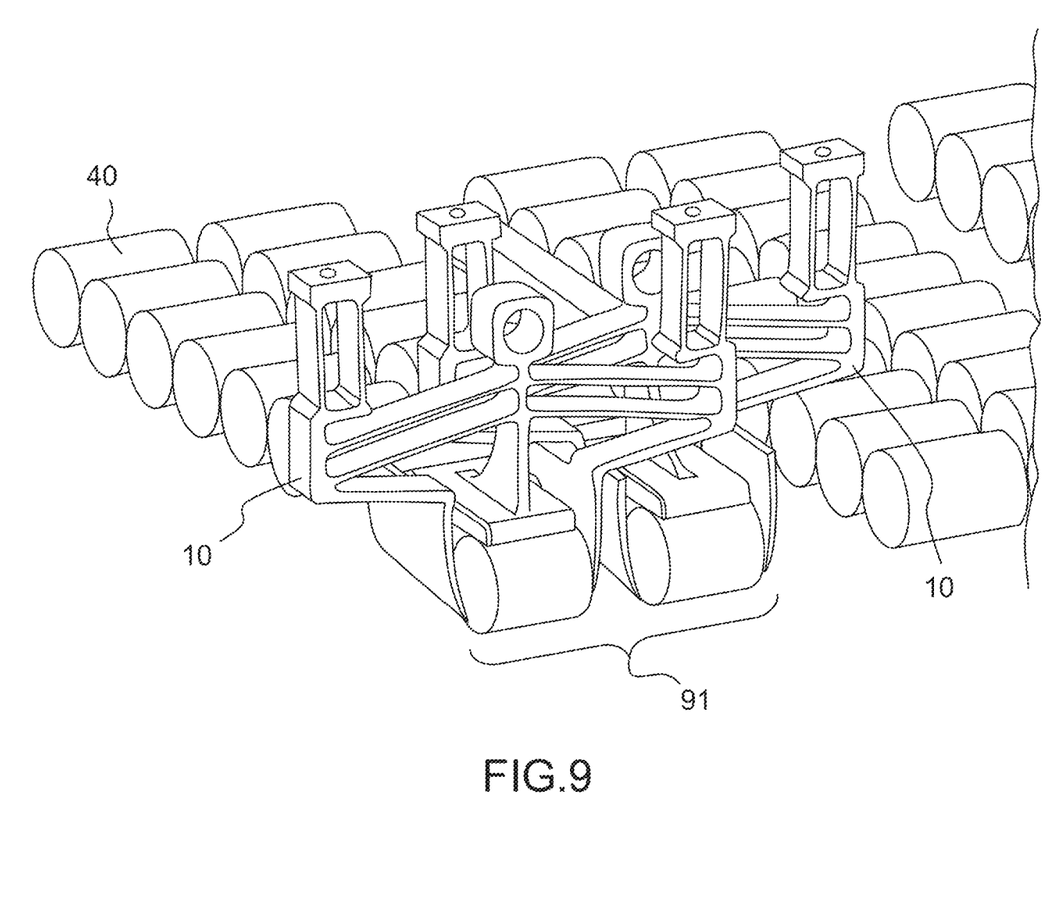
FIG. 9: in a partial view, the way of embodying one exemplary embodiment of a gripper system according to the invention comprising a set of the above devices.

FIG. 9 illustrates, in a partial view, the embodying of the system for gripping several objects in parallel, notably in large quantity, for example several dozen at a time. In this context, a device 10 according to the invention will be referred to as an elementary gripper clamp.

The system of FIG. 9 is made up of several elementary gripper clamps. In this embodiment, the jaws are enlarged as in the example of FIG. 8. The elementary gripper clamps 10 are arranged in a staggered configuration. More specifically, they are arranged in double rows 91, just one of which has been depicted. In each double row, the gripper clamps 10 are arranged in a staggered configuration as illustrated in FIG. 9, where just two gripper clamps of a double row are depicted. Such a configuration is notably advantageous for picking objects and placing them in a housing, not depicted, able to contain at least two rows of objects.

Each gripper clamp is able to grip two objects, making it possible to double the handling capability with respect to the number of clamps. Thus, by using 40 gripper clamps 10, it is possible to handle 80 objects.

Figure 10:
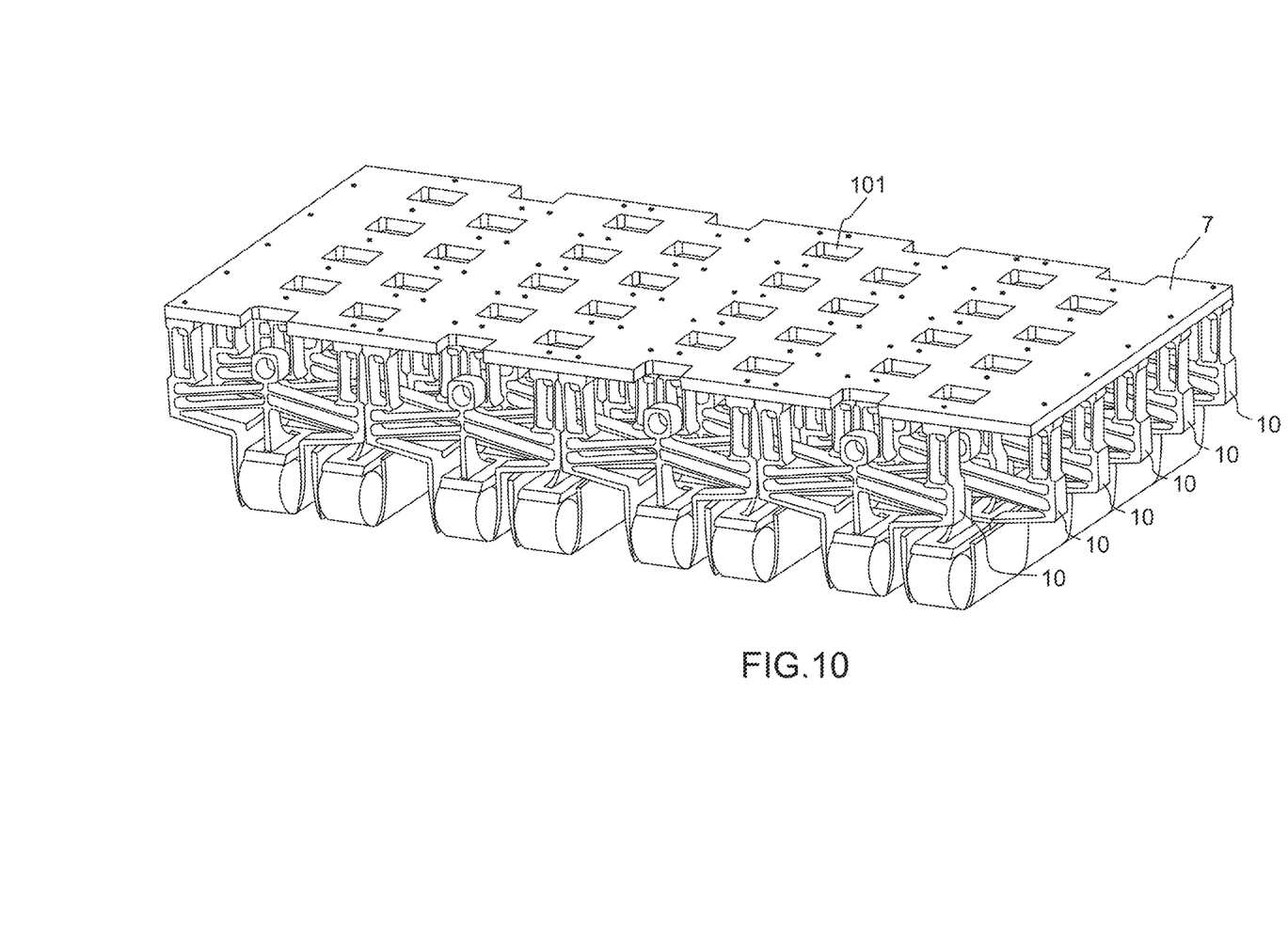
FIG. 10: the exemplary embodiment of FIG. 9 in its full version.

FIG. 10 illustrates the complete system made up of four double rows of ten gripper clamps each, thus allowing 80 objects to be gripped. The gripper clamps 10 are fixed to a structure 7 at their upper parallelograms as illustrated in FIG. 1. This structure is, for example, a plate. The elementary gripper devices, namely the gripper clamps 10, are fixed to the structure 7 via the ends of the flexible beams 11, 12, 11', 12', for example via the rigid part 14 itself fixed to the structure.

Openings 101 are provided for the passage of a gripper-clamp activation mechanism, this mechanism applying a force in one direction and the other to the activation point 8 of each gripper clamp. In operation, the structure 7 is for example fixed to a robot arm coupled to the activation mechanism producing a relative movement of the gripper clamps with respect to the structure. The actuator, or the activation mechanism, may be the same for all the gripper clamps 10. The approach, picking and ejection phases are those described in relation to FIG. 4, but for several dozen clamps in parallel, all moving simultaneously.

There are of course other ways of placing the gripper clamps in parallel in order to create gripper systems capable of handling large quantities of objects. Implementation of such systems advantageously facilitated by the fact that the gripper clamps 10 are monolithic and may be low in mass.

Advantageously, a gripper device according to the invention is a deformable monolithic gripper clamp made from a single material compatible with hygienic design requirements. The material used may be a polymer of the type polyoxymethylene, POM homopolymer or copolymer of acetal, polyetheretherketone also known by the name PEEK, polyamide or polyimide. There are no articulations within the device, thereby avoiding certain risks of fouling or of contamination, for example with grease or oil for example, and making it easier to clean. These advantages are notably of key importance in agri foodstuff production lines.

There is no play and neither is there any friction, ensuring optimum precision in the movement of the jaws when gripping objects.

Inexpensive and robust, a device according to the invention is easily manufactured by molten polymer deposition, or by laser cutting or even by numerically controlled cutting. All the components of the device and notably the beams are machined from a single block of material.

Finally, the device according to the invention is a flexible monolithic system, equivalent to a polyarticulated kinematic system, which does not require assembly, avoids the problems of fouling, and facilitates cleaning and manufacture. In addition, it is inexpensive, reliable, and low in mass. Its life is also increased by a careful layout and structure of the beams.

A single linear actuation force makes it possible to obtain, first of all, the clamping of two jaws onto the object during the clamping phase, and then, during the placement phase, to obtain detachment and then guided placement of the product using the push plate. These movements are synchronized by the very topology of the mechanical structure of the device. Production cycles are thereby optimized and production rates improved.

In the case of the gripping of deformable and sticky food products on an agri foodstuffs production line for example, the invention makes it possible to cope with the errors in the positioning of the products on the conveyor and to adapt to the shape defects and disparities in flexibility and stickiness according to the different types of product.

The invention has been described for a preferred embodiment in which the end of the bar 9 is provided with a plate 5. It is possible to anticipate an embodiment without a plate, for use notably where there is no need to push the object when it is being released by the jaws 4, 4'.

The invention claimed is:

1. A gripper device of the gripping clamp type, wherein it comprises at least:
   a bar longitudinally mobile along an axis of symmetry;
   a first rigid connection and a second rigid connection which are symmetrical about said axis each ending in a jaw, the two jaws forming a gripper clamp able to pick up an object;
   two first pairs of flexible beams which are symmetrical about said axis, said beams each being connected by one end to one of said rigid connections, the other end being fixed, and guiding the movements of said rigid connections perpendicular to said axis, the ends of each of said two first pairs of beams forming a parallelogram;
   two second pairs of flexible beams which are symmetrical about said axis, said beams each being connected by one end to one of said rigid connections, the other end being connected to said bar, and guiding the movements of said bar parallel to said axis, the ends of each of said two second pairs of beams forming a parallelogram;
   the movements of said jaws being brought about by actuation of said bar, a force exerted on said bar in a direction away from said jaws causing said jaws to move closer together, a force exerted in the direction of said jaws causing said jaws to open.

2. The gripper device as claimed in claim 1, wherein with said bar being provided at one end with a plate, the length of said bar is such that said plate is able to push said object when said force is exerted toward the jaws, the pushing being performed simultaneously with the opening of the jaws.

3. The gripper device as claimed in claim 1, wherein it is monolithic.

4. The gripper device as claimed in claim 1, wherein said beams having a fixed end are connected to a rigid part able to be fixed to a structure.

5. The gripper device as claimed in claim 1, wherein said beams are curved and not parallel.

6. The device as claimed in claim 5, wherein said beams connected to said bar comprise several rectilinear sections, the sections leading from the ends of said beams being parallel.

7. The device as claimed in claim 6, wherein said beams comprise three rectilinear sections.

8. The device as claimed in claim 1, wherein said beams have non-constant cross sections.

9. The device as claimed in claim 8, wherein the cross sections are at a maximum at the points of attachment of said beams and decrease toward the center of said beams.

10. The device as claimed in claim 1, wherein said jaws are flexible.

11. The device as claimed in claim 1, wherein activation of said bar is performed by means of a ring fixed at the opposite end of said bar to said plate.

12. A gripper system, wherein it comprises a set of devices as claimed in claim 1.

13. The gripper system as claimed in claim 12, wherein said devices are positioned in at least a double row, in a staggered configuration.

14. The system as claimed in claim 12, wherein said beams of said devices having a fixed end are fixed to a structure in the form of a plate.

15. The system as claimed in claim 12, wherein it is able to be used in an agri foodstuffs production line, said object to be picked being a deformable food product.

* * * * *